Patented Dec. 8, 1931

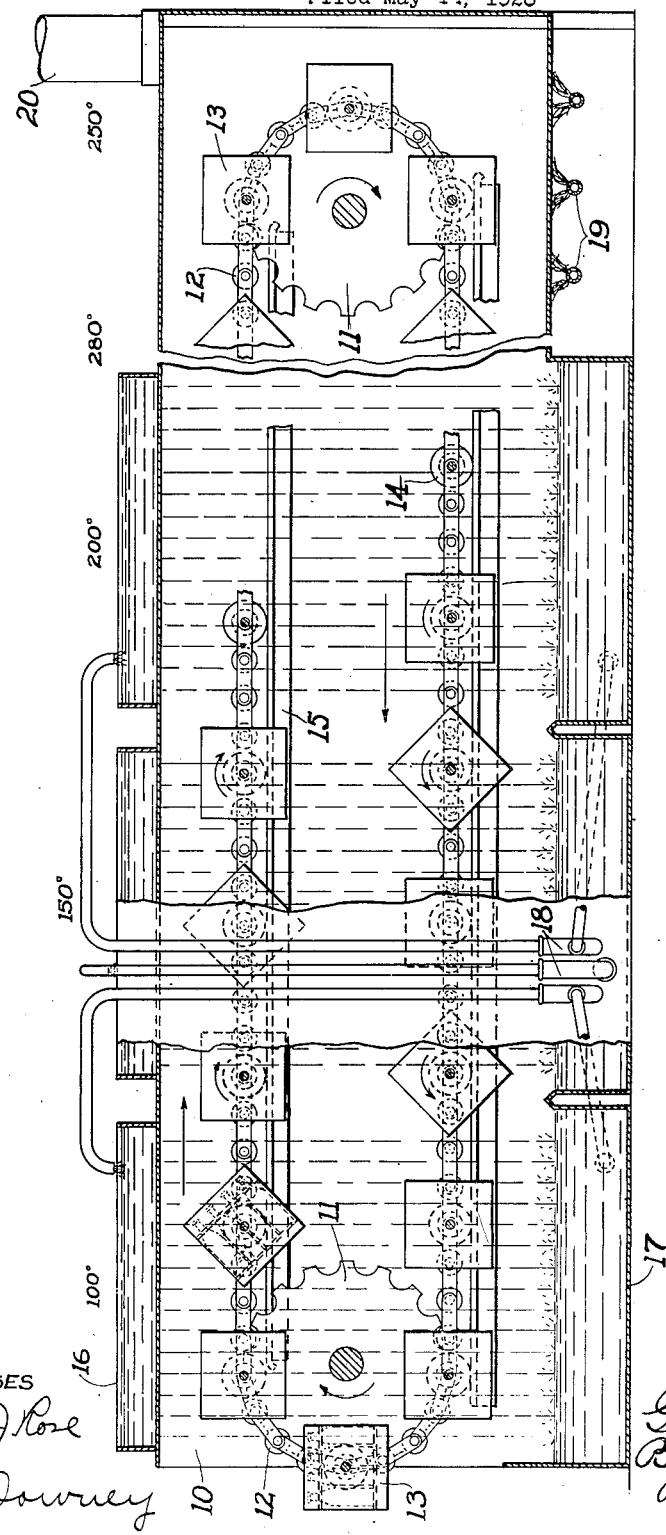

1,835,799

UNITED STATES PATENT OFFICE

GEORGE J. MEYER, OF MILWAUKEE, WISCONSIN, ASSIGNOR TO GEO. J. MEYER MANUFACTURING COMPANY, OF MILWAUKEE, WISCONSIN, A CORPORATION OF WISCONSIN

DRY HEAT STERILIZER

Application filed May 14, 1928. Serial No. 277,557.

This invention has for its object to provide a sterilizer for processing foods or other material at temperatures which are controlled by automatic thermostats in a dry chamber.

An object of the invention is to provide a more economic structure than is otherwise possible, to dispense with the use of steam, to obtain a high temperature with the least possible mechanism and to enable the goods to be agitated in the carriers to any desired extent, or not at all.

Another object of the invention is to provide a dry heat sterilizing chamber with a tempering zone at one end through which the goods enter and leave the sterilizing chamber while passing through water sprays of different temperatures for cooling the outgoing goods and heating the incoming goods in such a manner that the heat taken from the former is given to the latter.

With the above and other objects in view the invention consists in the dry heat sterilizer as herein claimed and all equivalents.

Referring to the accompanying drawing in which the figure constitutes a longitudinal sectional view of a dry heat sterilizer exemplifying the present invention with the greater portion of the sterilizing chamber omitted for clearness of illustration, 10 indicates a housing of a length considerably greater than that shown and having one end open to form a loading and unloading station and the other end closed to form a sterilizing chamber where the highest temperature is maintained.

Suitably driven sprocket wheels 11 are mounted at these two ends of the housing to support an endless conveyor consisting of roller chains 12 having rotatably mounted between them at regular intervals box-like crates or carriers 13 for containing bottled goods or other material to be sterilized, such goods being so confined therein as to permit of the carriers being inverted and being exposed to the water sprays that will be later described. Each carrier 13 has trunnions at its ends passing through the links of the chain as pivotal connections therefor and carrying rollers 14 fixed thereon which travel on supporting tracks 15 mounted in any suitable manner as by forming them of angle iron and attaching them to the side walls of the housing. As the chains travel, the carrier rollers 14 roll on the tracks to support the weight and to cause them to rotate at a speed which may be increased or diminished by reducing or enlarging the diameter of said rollers. If it is desired that the carriers should not rotate, their rollers may be omitted, when the chain rollers bear on the tracks to support the weight.

Near the open end of the housing and on top thereof are provided water pans 16 with perforated bottoms through which water is sprayed upon the goods as they pass therebeneath, and at the bottom of the housing water tanks 17 are provided to catch the water, there being a water tank for each water pan connected therewith by a water pump 18 and piping so that the water dropping from each pan is returned to it. The temperature of the water sprayed upon the goods increases progressively as the sterilizing chamber is approached and the loss of heat thereof incident to the warming of the incoming goods is regained incident to the cooling of the outgoing goods directly beneath, so that the temperatures of the various water sprays are readily maintained. For example, the water in the first water pan may be 100° F., that of the second pan 150° F., and that of the third pan 200° F., with the temperature maintained in the sterilizing chamber at the closed end of the housing from approximately 280° F. to 250° F.

The sterilizing chamber may be heated in any desirable manner preferably by means of gas burners 19 beneath it and a control vent 20 may be provided at its end.

The length of the apparatus is in proportion to the amount of goods to be treated as is also the width, it being desired to require approximately one hour to pre-heat, sterilize at the required temperature and return for cooling. If the containers are filled cold, the apparatus of course will have greater length and with such addition the goods may be cooled down to a lower temperature with the use of less water for cooling. If glass containers are used, the temperature changes should be varied with smaller steps and if the goods are filled in the package cold, the preliminary heating is done with water.

When the machine is in full operation, the water from the lower tanks is pumped to the upper spray pans and this water sprayed over the traveling goods tends to bring them to its temperature, the same water serving to pre-heat incoming goods and to cool outgoing goods. A sufficient number of pans is provided so that suitable temperature variations can be made, approximately 50 degrees per step being necessary with glass containers.

If cold bottles are fed into the machine, it will take about four pans to bring it up to the boiling point and from this temperature dry heat is supplied. With the burners for heating the sterilizing chamber, it is possible to have a variable temperature within it. In order to give an equally rapid rise in temperature to the zone where the goods approach the final sterilizing temperature, it is kept at a temperature slightly above sterilization and the goods pass into the sterilizing zone where a very little rise is necessary. These temperatures are controlled in accordance with the size of the container as well as the consistency and conductivity of the goods to be sterilized, and it is easily possible to regulate the temperature to any degree required.

Sterilizing is not performed in the water spray end of the tunnel where the temperature only ranges from 100° to 200°, but it is performed in the larger closed portion of the tunnel beyond, where the temperature ranges from 280° to 250°, and in this closed sterilizing main portion of the tunnel, which may be of much greater length than the spray portion, the sterilizing is done by dry heat, the confined air therein being heated by the burners 19. It should be borne in mind that the greater portion of the sterilizing chamber is omitted for clearness of illustration, as stated.

Assuming that bottles are used that are preferably packed into the carriers, the latter would be as long as the bottles are high so that the end section of a carrier would be approximately square, the width of the carrier depending upon the capacity required and the length may be from three to ten feet to suit the width of the apparatus. Covers are provided to hold the goods in the carriers and if bottles are used, these covers are provided with openings to suit the bottles so that their crowns would project through the covers and there will be no injury to them while the carriers are rotated.

The rotation of the carriers not only serves to agitate the goods to the required extent but it also facilitates the pre-heating and the cooling by presenting the different parts of the containers to the action of the sprays.

What I claim as new and desire to secure by Letters Patent is:

1. In a sterilizer, a sterilizing chamber, a passageway through which the goods travel to and from the sterilizing chamber without intervening partitions, and a series of water sprays in said passageway to shower the goods and form a water curtain for closing the sterilizing chamber, said water sprays having progressive temperatures and serving to heat the incoming goods and to cool the outgoing goods.

2. In a sterilizer, a sterilizing chamber, a passageway through which goods travel to and from the sterilizing chamber without intervening partitions, and means for forming a water curtain closing the sterilizing chamber, comprising water spray pans on top of the passageway to shower the goods, water tanks at the bottom of the passageway beneath the spray pans to receive the water spray therefrom, and pumps for returning the water from the tanks to the respective spray pans.

3. A dry heat sterilizer, comprising a sterilizing chamber, means for heating it, a conveyor for conducting goods through the sterilizing chamber, a passageway through which the goods travel to and from the sterilizing chamber without intervening partitions, and means for pre-heating the incoming goods and for cooling the outgoing goods consisting of a series of water sprays forming a water curtain for the sterilizing chamber for showering the goods at progressive temperatures in said passageway.

4. A dry heat sterilizer, comprising a housing opening at one end to form a loading and unloading station and closed at the other end to form a sterilizing chamber, the portion of the housing between the loading and unloading station and the sterilizing chamber constituting a passageway for the sterilizing chamber, a water curtain across the passageway, an endless conveyor extending through the housing from one end to the other, carriers thereon containing goods to be sterilized, said carriers being rotatably mounted on the conveyor, rollers fixed on the carriers and tracks on which the rollers travel for causing the carriers to be rotated as they travel through the housing.

5. A dry heat sterilizer, comprising a housing open at one end to constitute a loading and unloading station and closed at the other end to form a vented sterilizing chamber, means for heating the sterilizing chamber, that portion of the housing between the loading and unloading station and the sterilizing chamber forming a passageway, a suitably driven sprocket at the ends of the housing, roller chains passing therearound, carriers rotatably mounted between the roller chains, rollers fixed on the carriers, tracks on which the rollers travel for rotating the carriers and means for pre-heating the incoming goods and cooling the outgoing goods, and comprising water spray pans above the passageway for spraying water on the goods as they pass to and from the sterilizing chamber, tanks beneath the spray pans to catch the water therefrom, and pumps for returning the water from the tanks to the spray pans.

In testimony whereof, I affix my signature.
GEORGE J. MEYER.